United States Patent
Basham et al.

(10) Patent No.: US 7,174,265 B2
(45) Date of Patent: Feb. 6, 2007

(54) HETEROGENEOUS MULTIPATH PATH NETWORK TEST SYSTEM

(75) Inventors: Robert Beverley Basham, Aloha, OR (US); Richard Earl Jones, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/128,632

(22) Filed: May 13, 2005

(65) Prior Publication Data

US 2006/0265172 A1    Nov. 23, 2006

(51) Int. Cl.
*G06F 19/00* (2006.01)
*G06F 11/30* (2006.01)

(52) U.S. Cl. .................. 702/122; 702/123; 702/185
(58) Field of Classification Search .............. 702/108, 702/122, 123, 183, 184, 185, 121; 714/2, 714/15, 25

See application file for complete search history.

(56) References Cited

U.S. PATENT DOCUMENTS

| | | | | |
|---|---|---|---|---|
| 4,306,286 A | 12/1981 | Cocke et al. | ............... | 364/200 |
| 5,410,686 A | 4/1995 | Kish | ........................ | 395/575 |
| 5,799,207 A | 8/1998 | Wang et al. | ................ | 395/858 |
| 6,256,753 B1 | 7/2001 | Williams | ..................... | 714/47 |
| 6,370,659 B1 | 4/2002 | Maney | ........................ | 714/25 |
| 6,470,463 B1 | 10/2002 | Chen et al. | .................. | 714/25 |
| 6,571,357 B1 * | 5/2003 | Martin et al. | ................. | 714/28 |
| 6,643,727 B1 | 11/2003 | Arndt et al. | ................ | 710/314 |
| 2004/0106088 A1 * | 6/2004 | Driscoll et al. | ............ | 434/118 |

* cited by examiner

*Primary Examiner*—Bryan Bui
(74) *Attorney, Agent, or Firm*—Randall J. Bluestone

(57) ABSTRACT

A test system for a heterogeneous multipath network. A tester system evaluates a plurality of status indicators from a plurality of types of test components in a network. Based on the status indicators of at least one of the test components, the tester system selects a first test to be performed. After executing the first test, the tester system selects a second test to be performed based on the status indicators of at least one of the test components and a result of the first test.

7 Claims, 3 Drawing Sheets

HETEROGENEOUS MULTIPATH PATH NETWORK TEST SYSTEM

BACKGROUND OF THE INVENTION

1. Field of the Invention

The present invention relates to testing computer hardware and software and more particularly to a method, apparatus and program storage device for deploying and testing computer hardware and software in heterogeneous multipath computer systems.

2. Description of Related Art

Many enterprise computer products require testing in a systems environment with many components combined together via networks. For example, an enterprise level storage server solution typically includes the storage server as well as storage management console control software designed to run on one or more workstations coupled to the storage server via a network. Part of the process of developing a new storage server includes testing the storage server at various stages of development in a network coupled to storage management consoles via a network.

A conventional approach to setting up testing of a computer hardware and or software product under development involves having a development team manually set up a physical resource, such as a server, in a desired manner and often install one or more software packages as part of the test environment. The Rational® Tool Set is an example of a conventional tool set for deploying tests on a given platform, such as for testing a Linux server. Such conventional tool sets are designed for use in testing finished products where each unit of the product being tested should have essentially the same functionality, therefore any test failure indicates a product malfunction. These conventional tool sets are not designed to handle test deployment in an unstable networked systems environment. Therefore in a product development environment where it is necessary to test a range of product build releases at varying stages of development and functionality a test team has to manually rebuild the test suites to test each different stage of build release. Typically some portion of the development team has to drop their development work to manually test the build release to ensure that the build release to be delivered to a test team is in a usable state that will allow for meaningful testing and/or interaction with external interfaces to occur. A common procedure today is to run a standard test suite (commonly called a smoke test) against the build release to ensure that it meets a certain minimum set of criteria before being deployed for more comprehensive testing.

There are clear drawbacks with this conventional approach to testing products under development including that it takes a great deal of time to manually perform many aspects of the process of evaluating a product build to determine whether it is ready for more comprehensive testing. For example, conventional approaches to test deployment are often plagued by functional limitations in the command line interface ("CLI"), graphical user interface ("GUI"), or application program interface ("API"). Furthermore, since the process is manual there exists a large degree of user influence that dictates what the outcome of the evaluation will be, for example, certain test cases might be skipped. Furthermore, as with any human-executed task, a test case result may be inaccurate based on configuration errors, missed steps or plain and simple misinterpretation and/or misunderstanding of the resulting output. This can turn out to be not only time consuming but quite costly if a software or hardware error escapes into the field with the product.

It can be seen that there is a need for an improved product test deployment and execution process to improve the efficiency, accuracy and reliability of the process.

SUMMARY OF THE INVENTION

To overcome the limitations in the prior art described above, and to overcome other limitations that will become apparent upon reading the present specification, the present invention discloses a method, apparatus and program storage device for a test system for a heterogeneous multipath network.

In an initial test network configuration process tester client code is deployed to a plurality of types of systems in a heterogeneous multipath network. Status indicators to evaluate for a plurality of test components are then selected. A plurality of tests to include in a test program are then selected based on attributes of the test components. Next, test dependencies are identified based on at least the selected status indicators for the test components in the heterogeneous multipath network and the selected tests. Lastly, a test program is generated based on at least the selected tests and the identified test dependencies.

After the tester system has been configured for a test environment, the tester system can execute tests to evaluate the functionality of the test components. In the test program execution process, the tester system evaluates a plurality of status indicators from a plurality of types of test components in a network. Based on the status indicators of at least one of the test components, the tester system selects a first test to be performed. After executing the first test, the tester system selects a second test to be performed based on the status indicators of at least one of the test components and a result of the first test.

These and various other advantages and features of novelty which characterize the invention are pointed out with particularity in the claims annexed hereto and form a part hereof. However, for a better understanding of the invention and its advantages reference should be made to the drawings which form a further part hereof, and to accompanying descriptive matter, in which there are illustrated and described specific examples of preferred embodiments of the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description of preferred embodiments of the present invention, reference is made to the accompanying figures, which form a part hereof, and in which is shown by way of illustration specific embodiments of the invention may be practiced. It is to be understood that other embodiments may be utilized as structural changes may be made without departing from the scope of the present invention.

The present invention provides a method, apparatus and program storage device for the deployment and execution of test suites in a heterogeneous multipath network test environment. This process can include installing code on several types of hardware platforms in the test environment, deploying workarounds for known short-comings of early product versions, verifying that the installation and deployment process has completed as expected, running a series of automated tests that evaluate whether the test network and the product build is in a condition to allow one or more test suites to be executed, and executing test suites to evaluate product functionality. A primary application of the present invention is in the deployment and testing of systems when a product is still under development. It can also be used to deploy and execute testing of finished products as part of a product manufacturing process.

Figure 1:
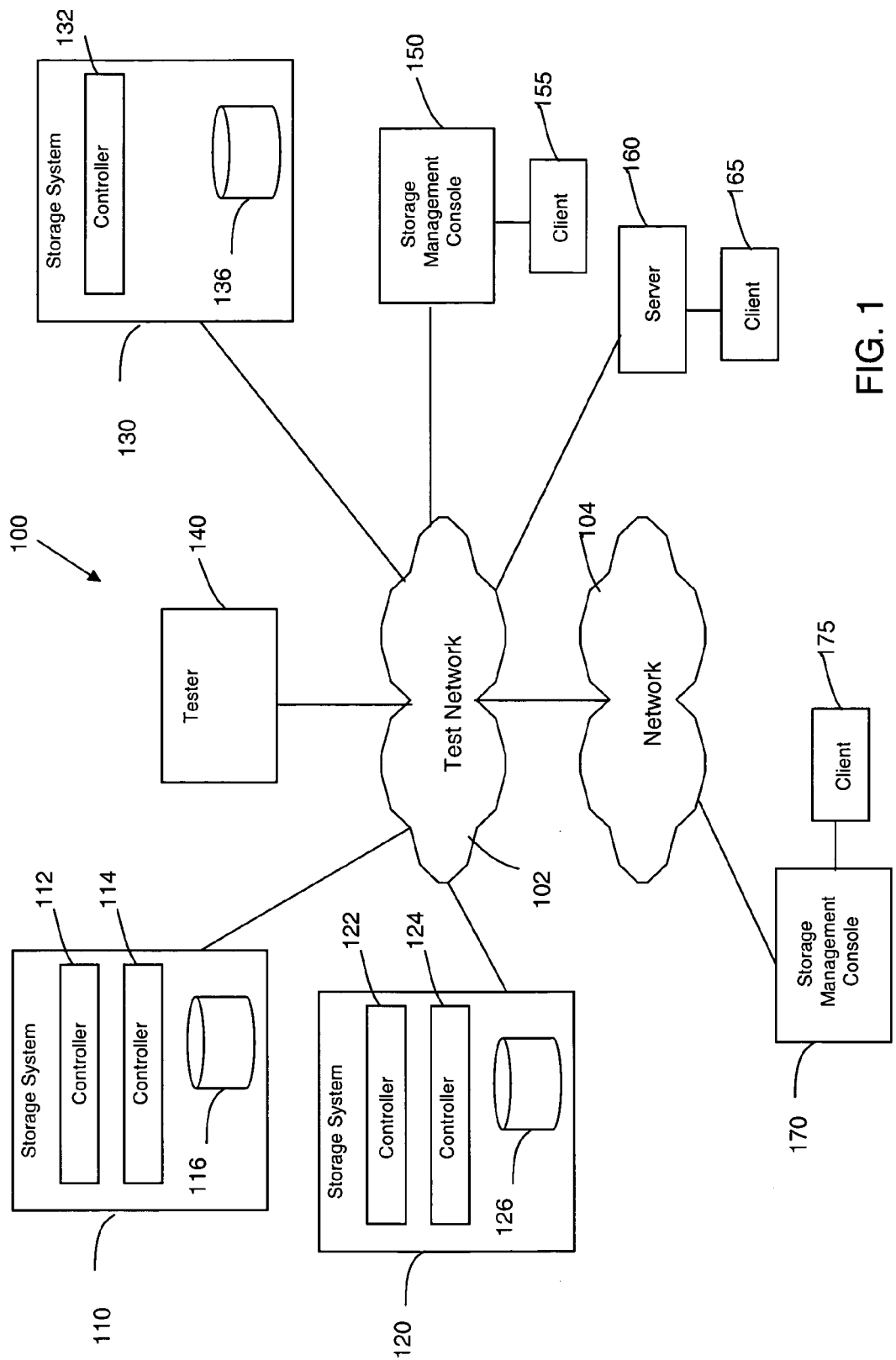
FIG. 1 illustrates a block diagram of a heterogeneous multipath network test environment according to an embodiment of the present invention.

FIG. 1 illustrates a block diagram of a sample heterogeneous multipath networked system test environment 100 in which the present invention can be practiced. In FIG. 1, the test environment includes three storage systems 110, 120 and 130, a tester 140, two storage management consoles 150 and 170 and a server 160. The three storage systems 110, 120 and 130, tester 140, storage management console 150 and server 160 are all coupled together via a multipath test network 102. Test network 102 may comprise a storage area network or one of many other types of networks as is well known by those of ordinary skill in the art. Storage management console 170 is coupled to test network 102 via network 104, which for example may be a Local Area Network or a company-wide intranet. Tester 140 executes code to perform the automated deployment and test process of the current invention.

Each of the storage systems 110, 120 and 130 is a storage system under development, and each system is at a different stage of development with varying levels of functionality and reliability. For example, the storage systems under test may be prototypes with different microcode revision levels, or pre-prototype phase build releases. The complete version of the storage system includes two controllers and a minimum of four and maximum of 20 disk drives. The disk drives would typically be hard disk drives, however, any type of storage device may be used, for example tape, optical or solid state storage devices. Each storage system controller runs a Linux kernel. Several applications run on top of the Linux kernel including applications to manage I/O and to manage the cache.

Storage system 110 includes a first controller 112, a second controller 114 and disk storage 116 comprising eight disk drives. Storage system 120 includes a first controller 122 and a second controller 124, disk storage 126, however disk storage 126 only has two disk drives installed which is less than the minimum of four disk drives required for normal operation. In development environments hardware resources, such as disk drives, are often limited and it is useful to be able to conduct applicable tests on incomplete systems. For example, to be able to test some basic level of functionality of the storage system controllers which does not require four disk drives to be installed in the storage system. Storage system 130 includes a controller 132 and disk storage 136 comprised of twelve disk drives. However storage system 130 does not have a second controller installed. In addition to the foregoing the storage systems under test may have additional differences, for example a storage system may have only one or more of the storage controller applications or may just have one of the software components such as just a command line interface ("CLI") component or just a graphical user interface ("GUI") component. Hardware components may be at varying prototype versions with differing levels of capabilities. The hardware components may also have any number of malfunctioning devices and or components. For example with a storage system a disk drive could catastrophically fail causing the Redundant Array of Independent Disks ("RAID") in the storage system to initiate a rebuild process; disk drives may still be in a formatting state, a read only state or other state where the drive is not ready for normal read/write operation; an operating system for a management console could have a corrupt file system; a network card could have a malfunction, etc. Despite having a wide range of missing and or malfunctioning elements, the test system of the present invention enables applicable tests to still be performed.

Storage management consoles 150 and 170 control storage systems 110, 120 and 130 to manage the storage of data in particular storage systems as well as the overall performance of the storage network. Each storage management console may be coupled to multiple storage systems to control the storage systems' operation. Storage management consoles 150 and 170 may also have a one or more clients/agents 155, 175. Storage management consoles generally allow for users to enter commands to control the storage systems via a command line interface client and or a graphical user interface client. The storage management consoles may then communicate with the storage systems via an application program interface ("API"), either a proprietary API or an industry standard API such as the Storage Management Initiative Specification (SMI-S) based on the Common Information Model Object Manager ("CIMOM"). Software tools based on Secure Shell ("SSH") or on the Web-Based Enterprise Management ("WBEM") Initiative can provide remote CLI and API support.

Server 160 is a host system responsible for running 10 and data to the storage system. Alternatively, server 160 can be a file server which can be used to store the dependency tree, the test cases, test results, machine states and other relevant data.

Tester 140 may be a workstation, single server, cluster of servers, storage system, or other computing platform. In one embodiment tester 140 comprises a workstation which also serves as storage management console. Alternatively, the workstation can control a storage manage console remotely using for example Remote Desktop, VNC, Secure Shell, Telnet, or other program. Tester 140 executes the automated test deployment software of the present invention. The test deployment software of the present invention may be based on an enterprise deployment tool such as WebSphere® from IBM with enterprise Java running on top of WebSphere. Another deployment tool that might be used is Tivoli® Orchestrator. Remote CLI and API support can be provided using tools like SSH or WBEM with links back to the Java code. In one embodiment tester 140 includes a Java bean to perform each block in FIG. 2. The tester client code which runs on the hardware platforms under test can for example be comprised of Java beans running on top of WebSphere. The client tester code can include Java beans to perform client functionality including communicate with the tester 140, select status indictors to evaluate, and drive testing of the product under test. To effectively deploy a test process and execute the test process in a heterogeneous multipath test environment, the present invention uses a combination of GUI, CLI, API, and white box methods since severe limitations may be imposed on how function is exposed to be tested. White box methods refers to methods which take advantage of internal features of a system which an end user would typically not have access to through the standard end user controls. In a preferred embodiment tester 140 includes a database to store state history for use in driving the dependency tree.

FIG. 1 illustrates a simplified test environment for implementing the present invention. A typical enterprise storage system test environment may include a wide range of test components including for example a hundred or more storage systems and or other types of servers coupled via one or more networks. In such larger test environments tester 140 may be comprised of a cluster of enterprise management servers. The present invention can be used to test a wide range of computer hardware and or software including for example network management software, enterprise application software, servers, routers and workstations.

Figure 2:
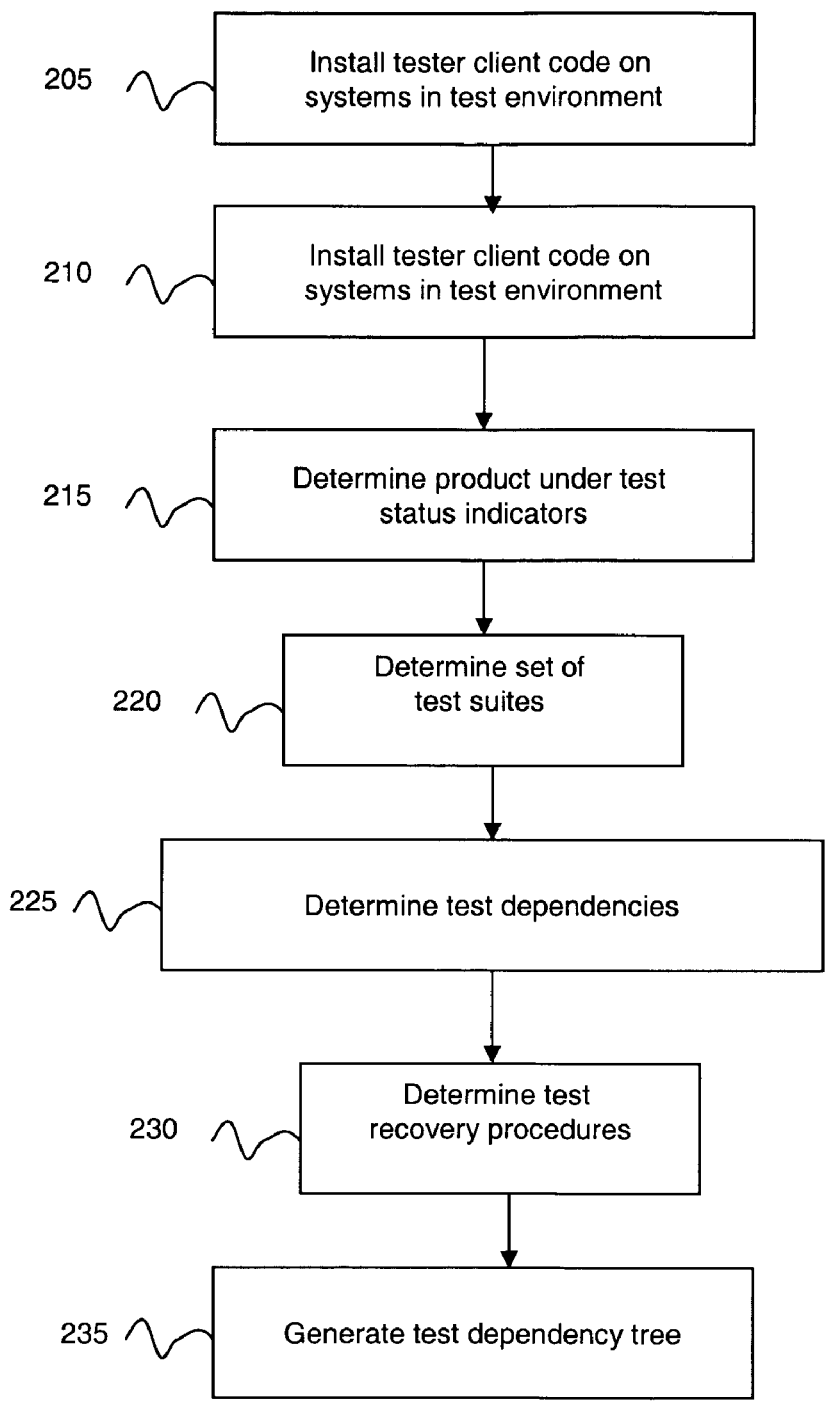
FIG. 2 illustrates a flow chart of a test deployment configuration method for a heterogeneous multipath network test environment according to an embodiment of the present invention.

FIG. 2 illustrates a flow chart of a test deployment configuration method for a heterogeneous multipath network test environment according to an embodiment of the present invention. The test deployment system of the present invention allows test characterization to continue even if a failure is encountered and optimizes test coverage and product characterization. For illustrative purposes the FIG. 2 flow chart is described with reference to test environment 100 in FIG. 1. This test deployment configuration process is executed when a new test environment is being set up for a product under development. As shown in FIG. 2, at 205 hardware and software in the test environment are identified. At 210, tester client code is installed on the systems in the test environment. The tester client code can be installed automatically along multiple paths. The tester client code would typically be installed on at least storage management consoles 150 and 170. Whether tester client code is installed on low level systems such as the storage systems can depend on a number of factors including the availability of required resources in the storage systems and the types of tests that may be executed. In one embodiment the central installation routine is controlled by a Java method that invokes a GUI install using a Rational XDE tester script from IBM®. If a tester client code installation fails using one path or sequence, the failing installation step is repeated to account for potential intermittent problems in the test environment. If the installation still fails, another network path or installation sequence is tried. This allows the deployment process to overcome certain limitations of the test environment which may result from having early prototypes with less than complete functionality. A combination of GUI, CLI, API, and white box methods may be needed. Such white box methods include using a script to perform a function that is not directly supported by a system's API, querying a database to obtain required input, or using certain low level utilities that would not typically be running with the product including automation of the password and authentication processes often necessary to run back door tools and/or system level commands and existing system scripts. If certain installation failures are not resolved by the available tools, then the status of the systems in the network are evaluated to determine whether certain tests can be executed even without completing the installation process. Installation sequencing is controlled by tester 140 which accesses available resources as needed to execute available test suites.

At 215 the product under test status indicators to be checked are defined based on attributes of the product to be tested. The status indicators may include physical description indicators and logical description indicators. For example, where the product under test is a storage system typical physical description status indicators include: is there an initial microcode load, is there a storage system network interface, the number of controllers in the storage system, the number of disk drives and the microcode version level. The logical description status indicators include: the type of operating system, the installed software programs versions, the number of logical volumes and the definition of extent pools. The product under test status indicators are used to determine what tests should be executed for each product under test in the test environment. In this manner for products under test that are missing certain components or certain functionality only those tests which can be executed without such components or functionality are selected for execution.

At 220 a set of test suites is defined which includes those tests that are expected to be supported by a current version of the product under development. This way tests that would certainly fail because they require functionality not yet incorporated in the given build release version are not executed. What tests are selected is controlled by a specifically formatted description of what functions are supported in the build release version. Test selection is also controlled by sequencing of the tests themselves. Some tests have dependencies on successful completion of other tests. This can be done using, for example, an XML based description or standard UML. This enables a test suite deployment package to generate a test set based on the specific properties of the current build release version.

At 225 test dependencies are defined. Test dependencies for a storage system may include dependencies based on hardware, firmware, software, and storage management console and server attributes. Dependencies can include whether a component or subcomponent is present and operational, as well as the performance of such elements for example response times, processing speeds, etc. Each of these test environment elements may have an associated test suite, and tests within each such test suite typically include dependencies on at least some of the other test environment elements.

At 230 test recovery procedures are defined. To accommodate systems in the test environment with varying levels of functionality, the test deployment automation system can perform recovery procedures to either attempt to correct a problem identified with a product under test, or to at least continue with other tests that may still succeed despite the encountered test failure. For example, if a test fails a recovery procedure may check whether the disk drives in the storage system under test have been formatted. If one or more of the disk drives is not formatted the test deployment automation system may initiate formatting of the disk drive(s). In a preferred embodiment the recovery procedures include taking a "snapshot" of the test component before executing recovery actions on the test component. The snapshot can be used to restore the test component to a known state for example in the event the recovery process fails. With new products, back-door ways to recover the system and get it back into a known working state are often used. These include reboots, internal resets of software components and power cycling. When a test component is in a state such that it is no longer sufficiently useful for executing tests, test component repair methods can be invoked. If the available automated tools are not successful, then the component is designated as being offline for debug by an engineer. When it is repaired by the engineer, the engineer returns the test component to the network of available components for test. This can be done dynamically while a test suite is being executed, not just before starting execution of a suite of tests.

At 235 the results from the preceding processes to define the test status indicators, test suites, test dependencies and test recovery procedures are all integrated to define test dependency trees which provide the test process flow. Test dependency trees define whether a given test is executed based on the status of the applicable test dependencies as well as the results from the preceding tests. Defining a test dependency tree includes defining the different states the product under test can be in and for each such state specifying tests that can be executed. Test dependency trees also include dependencies based on the state of other systems in the test environment, such as the state of the SMC's 150 and 170. For example, one test may to be create a logical volume. To execute this test, the storage system under test must have a logical configuration.

The results of tests can change one or more status indicators and therefore the state of the product under test. Hence both the state of a product under test and the test sequence are managed. Tests can be assigned a priority value so that higher priority tests in a test suite are executed first, for example using a simple scale from 1–10. This can enable tests that are more likely to pass to be executed first so as to get as far as possible in a test suite where some of the functions coming on line are new and there are dependencies on test sequencing. In one embodiment test dependency trees are created using a GUI tool and flow chart GUI objects to enable a user to visually render the test dependency tree. In a further embodiment a database is used to store test results and generate data re the likelihood of a test passing. This data can then be used in determining which test to execute next. The database can also be used to store machine states while tests are executed. This can enable problem test cases to be re-executed.

Test dependency trees are used to eliminate tests that based on results from preceding tests, including the status indicator values, would necessarily fail, thereby improving test efficiency. For example, if a build release only includes a CLI interface then the test dependency tree will eliminate the GUI test suite from the tests to be executed on that build release. From a deployment stand point, there often exists an inherent hierarchical set of dependencies. This dependency can be described using a hierarchical map, for example in XML or standard UML, which can be used as part of a configuration file for tester 140. For example, in a storage system, a test dependency tree may include checking whether there is an initial microcode load, harvesting metadata about the physical state of the storage system, and harvesting metadata about the logical configuration of the storage system then if all of the foregoing are successful initiating storage management console level testing of the storage system. For each permutation and combinations of test network elements (i.e. hardware, software, microcode) the corresponding test dependency tree describes the dependencies of all the different tests therein and the test flow process. Test dependency trees allow for an opportunistic deployment, efficiently using resources by executing from a bottom up point of view, avoiding conflicts and getting the most out of what tests can be executed. The result of the test deployment configuration process is a test program which can be executed to evaluate the functionality of products.

Figure 3:
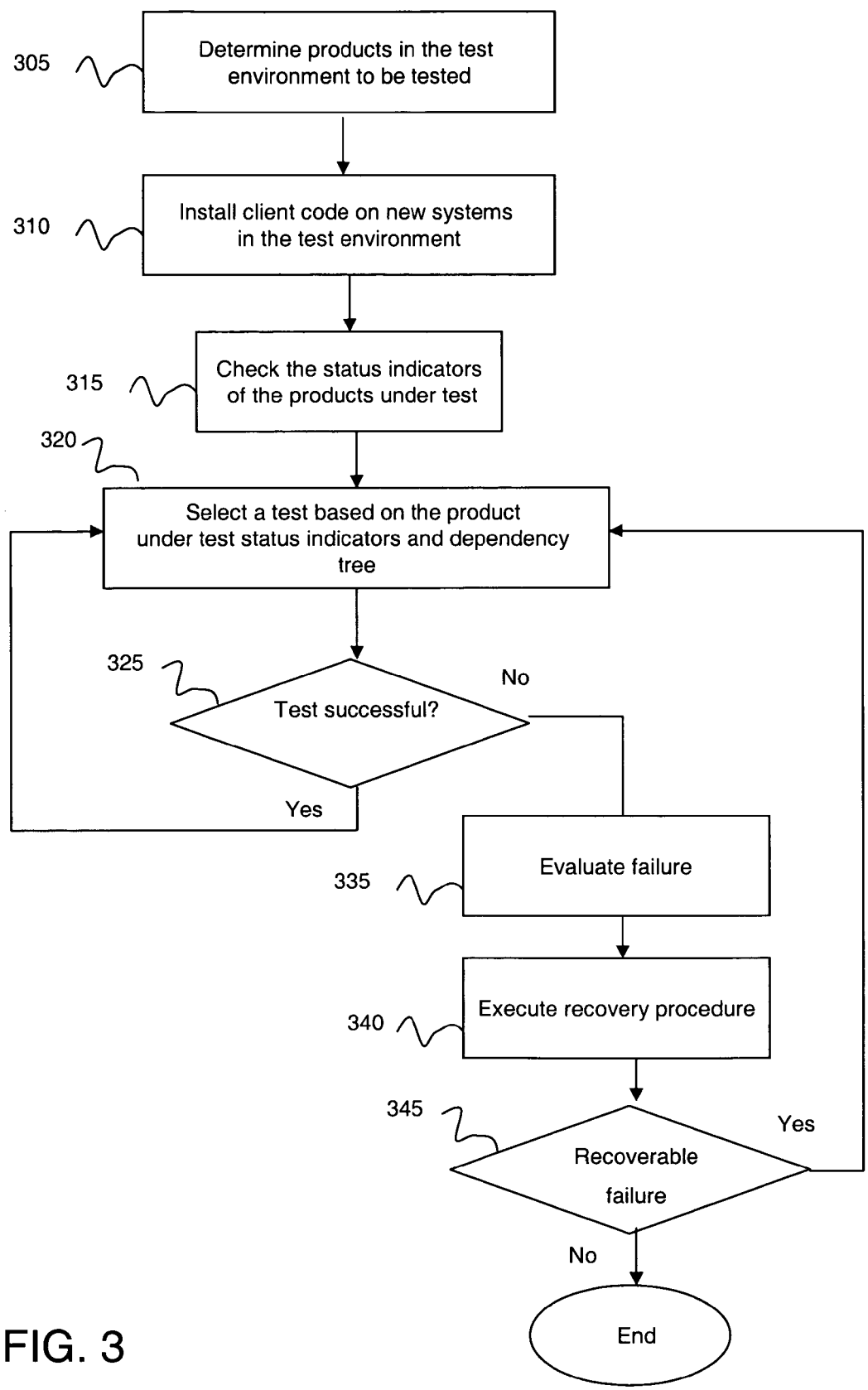
FIG. 3 illustrates a flow chart of a test program for a heterogeneous multipath network test environment according to an embodiment of the present invention.

FIG. 3 illustrates a flow chart of a test program according to an embodiment of the present invention. By way of example, the operation of the test program is described in connection with the test environment 100 shown in FIG. 1.

At 305 the specific products such as storage systems 110, 120 and 130, that are coupled to the test network to be tested are determined. At 310 tester 140 deploys tester client code to the required systems in the test environment, such as to those systems that have newly been added to the test environment. At 315 the status indicators of the products under test are evaluated. Evaluating the status indicators may require flexibility including using GUI, CLI, API and or white box methods depending on how stable the hardware platform is. At 320 a test is selected to be executed based on the product under test status indicator values and the test dependency tree.

If at 325 the selected test passes then a next test is selected at 320. If at 325 the selected test fails then at 335 the failure is evaluated. A first approach of the recovery procedure can be to retry the test to check for an intermittent problem. The status indicators can also be checked again to see if any component of the product under test has stopped working. Another approach is to execute the test using a parallel path to evaluate whether the problem is a software or hardware problem. For example, if a failure occurs in a test that uses a storage management console 150 GUI then the test can be executed using the CLI. If it works using the CLI then that is an indication it may be problem in the GUI software. Similarly, the failing test can also be executed on another storage system running the same software or microcode that is at issue. If the test passes on that storage system, then that can be an indication that the problem is a hardware problem.

Based in part on the results of the failure evaluation (335), a recovery procedure is executed at 340. Here again executing the recovery procedures may require flexibility including using GUI, CLI, API and or white box methods. For example, if a logical configuration test fails the test deployment system of the present invention may initiate reformatting of the storage system under test disk drives. Certain failures may result in terminating the execution of a particular test suite, however, another test suite that does not require the use of the failing elements can still be selected at 320. Recovery procedures may also include displaying a message or otherwise notifying a test operator and providing the test operator instructions for attempting to recover from the test failure, such as instruct the operator to replace a certain disk drive in a disk array. This can also include notifying operators at multiple sites to simultaneously execute certain recovery procedures where such procedures may be interdependent. If at 345 the recovery procedure is determined to be successful then the test program goes to 320 and selects a next test based on results obtained in the test process including any system changes or other results from the recovery process. Alternatively, if the recovery procedure failed, however other tests can still be performed the test process may continue at 320. If it is an unrecoverable failure then the test process ends, and a report of the test process results is generated.

While the present invention has been described in terms of preferred embodiments for achieving this invention's objectives, it will be appreciated by those skilled in the art that variations may be accomplished in view of these teachings without deviating from the spirit or scope of the present invention.

The invention can take the form of a hardware embodiment, such as tester 140 in FIG. 1, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A program storage device usable by a computer tangibly embodying code executable by the computer to perform operations for testing products in a heterogeneous network, the operations comprising:
    evaluating a plurality of status indicators from a plurality of types of test components in a network;
    selecting a first test to be performed based on the status indicators of at least one of the test components;
    executing the first test;
    selecting a second test to be performed based on the status indicators of at least one of the test components and a result of the first test; and
    wherein the operations further comprise in response to a test failure having a message be displayed indicating an action to be performed to enable additional tests to be executed.

2. The program storage device of claim 1 wherein evaluating a plurality of status indicators from a plurality of types of test components in a network further comprises:
    evaluating a plurality of status indicators from a plurality of types of computer devices to be tested; and
    evaluating a plurality of status indicators from a plurality of different code components to be tested.

3. The program storage device of claim 2 wherein the operations further comprise:
    storing test results in a database;
    updating a likelihood of a test passing based on the stored test results; and
    determining whether to execute a test based at least on the likelihood of the test passing.

4. The program storage device of claim 1 wherein the operations further comprise selecting, based on at least a plurality of the status indicator values, a first group of test suites to be executed from a set of potential test suites.

5. The program storage device of claim 1 wherein the operations further comprise selecting a third test to be performed based on a test dependency control module, wherein the test dependency control module selects tests to be executed based on dependencies including at least one dependency selected from the group consisting essentially of: hardware dependencies, firmware dependencies, software dependencies, server dependencies and client dependencies.

6. The program storage device of claim 1 wherein the operations further comprise:
    in response to a test failure selecting a test component recovery module for a failing test component;
    executing the test component recovery module for the failing test component;
    selecting a test to be executed based on a result of executing the test component recovery module.

7. A program storage device usable by a computer tangibly embodying code executable by the computer to perform operations for testing products in a heterogeneous network, the operations comprising:
    evaluating a plurality of status indicators from a plurality of types of test components in a network;
    selecting a first test to be performed based on the status indicators of at least one of the test components;
    executing the first test;
    selecting a second test to be performed based on the status indicators of at least one of the test components and a result of the first test;
    in response to a test failure having a message be displayed on a plurality of different systems in a plurality of locations indicating recovery actions to be performed on a plurality of systems in a plurality of locations to enable additional tests to be performed;
    after receiving confirmation the recovery actions have completed, executing additional tests.

* * * * *